United States Patent [19]
Watanabe et al.

[11] Patent Number: 5,063,320
[45] Date of Patent: Nov. 5, 1991

[54] FEEDER LEAD WIRE OF ROTOR FOR ELECTRIC MACHINE

[75] Inventors: Takashi Watanabe; Tatsuro Ishizuka, both of Hitachi, Japan

[73] Assignee: Hitachi, Ltd., Tokyo, Japan

[21] Appl. No.: 582,094

[22] Filed: Sep. 14, 1990

[30] Foreign Application Priority Data

Sep. 18, 1989 [JP] Japan .................. 1-240016

[51] Int. Cl.⁵ .............................................. H02K 3/48
[52] U.S. Cl. ...................................... 310/270; 310/42; 310/260
[58] Field of Search ............... 310/260, 259, 258, 261, 310/270, 42, 216; 29/598, 596

[56] References Cited

U.S. PATENT DOCUMENTS

| | | | |
|---|---|---|---|
| 2,774,899 | 12/1956 | Zeissler | 310/260 |
| 4,255,683 | 3/1981 | Krisch et al. | 310/260 |
| 4,588,916 | 5/1986 | Lis | 310/260 |

FOREIGN PATENT DOCUMENTS

| | | |
|---|---|---|
| 49-12710 | 4/1974 | Japan . |
| 50-84802 | 7/1975 | Japan . |
| 51-101803 | 8/1976 | Japan . |
| 52-39102 | 3/1977 | Japan . |
| 53-96604 | 8/1978 | Japan . |
| 54-15320 | 3/1979 | Japan . |

Primary Examiner—Steven L. Stephan
Assistant Examiner—Edward H. To
Attorney, Agent, or Firm—Antonelli, Terry, Stout & Kraus

[57] ABSTRACT

A rotor for an electric rotating machine includes a rotor winding, and a feeder lead wire connected to an inner end of the rotor winding so as to supply field current to the rotor winding. The feeder lead wire has a rising portion extending radially outwardly of a rotatable shaft, and a connecting terminal extending from the rising portion in a circumferential direction of the rotatable shaft.

8 Claims, 10 Drawing Sheets

FEEDER LEAD WIRE OF ROTOR FOR ELECTRIC MACHINE

BACKGROUND OF THE INVENTION

This invention relates to an electric rotating machine of the type capable of rotating at more than 1,500 rpm.

More specifically, the present invention relates to a lead-out portion of a rotor winding for feeding electric power to an end of the rotor winding of the electric rotating machine from the exterior, and also relates to a method of connection of the lead-out portion.

A conventional feeder lead wire of field coil is of such a construction as disclosed in Japanese Utility Model Unexamined Publication No. 53-96604, and its construction is determined in view of a cooling performance. However, any structural measures have not particularly been taken against the centrifugal force acting on a rising portion of the feeder lead wire.

For example, in the above conventional construction, laminated thin plates are used as the feeder lead wire, and because of their flexibility, the feeder lead wire is flexible with respect to the deformation due to the centrifugal force.

Where the laminated thin plates are not used, a thick plate is bent and is used as the feeder lead wire. In this case, a material of a low hardness having a cold-processing rate of about 25% is used in order to ensure a bending processability.

Even where a copper material of a relatively high hardness is used, the end of the rotor winding is joined to the upper portion of the feeder lead wire by brazing, and therefore the brazed portion has tended to be much lowered in hardness under the influence of the heat generated by the brazing.

Such construction and tendency will now be specifically described with reference to FIGS. 5 to 10.

Figure 10:
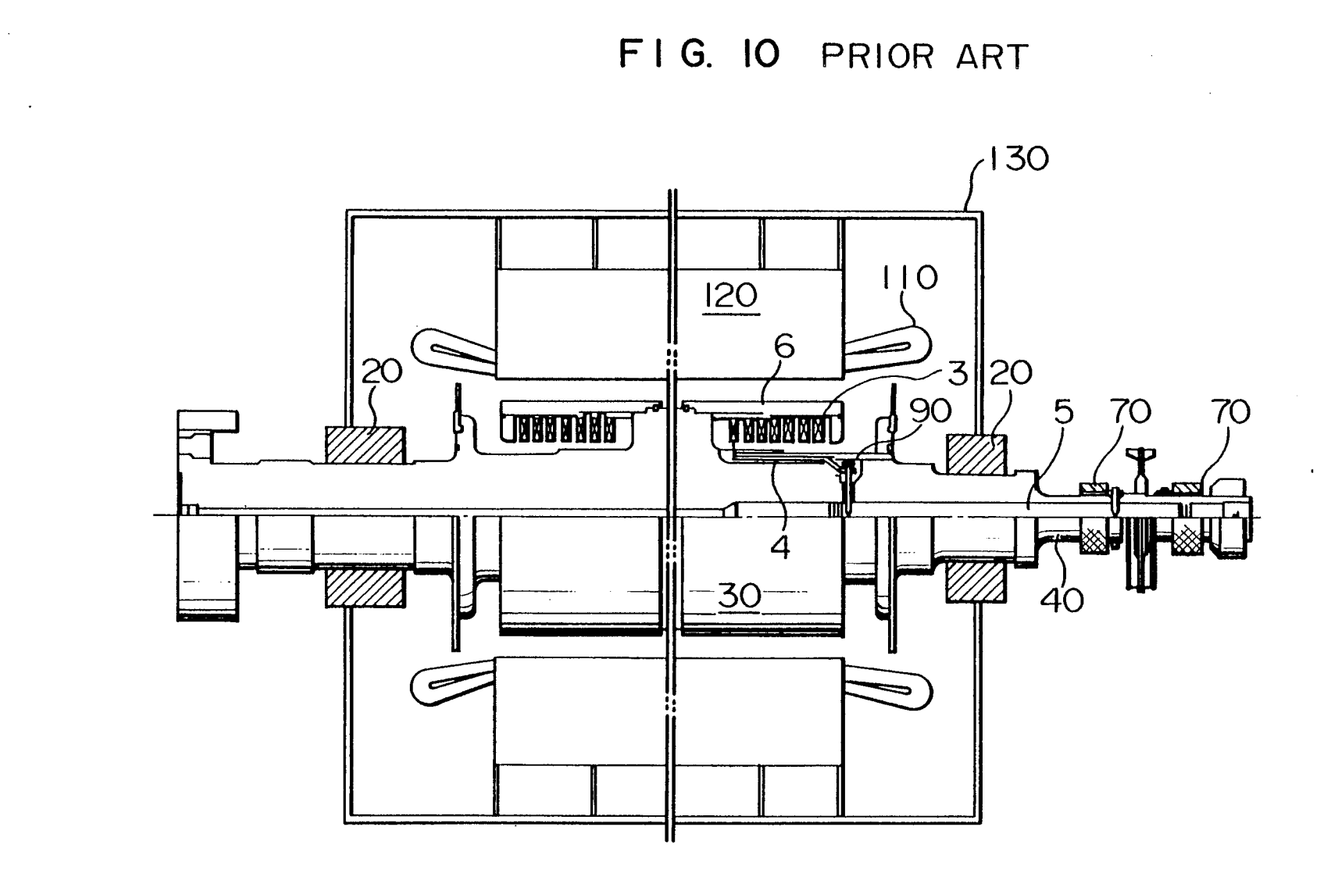
FIG. 10 is a schematic cross-sectional view of a prior art rotating electric machine.

FIG. 10 is a schematic cross-sectional view of an electric rotating machine. A rotor 30 supported at its opposite ends by bearings 20 comprises a rotatable shaft 40 provided with a rotor core, a rotor winding wound and received in a laminated manner in slots formed in the rotor core, and a support ring 6 shrinkage-fitted on the rotatable shaft 40 to support an end portion of the rotor winding 3 partially projecting axially from the rotor core.

Field current is supplied to the rotor winding 3 from the exterior of the rotor via collector rings 70, a lead wire 5 received in a central bore of the rotatable shaft 40, a terminal bolt 90 and a feeder lead wire 4.

The rotor 30 is rotated by an associated prime mover while generating a magnetomotive force by the field current, thereby generating a rotating field.

The rotating field causes a stator coil 110 to produce electric power, the stator coil 110 being arranged in surrounding relation to the rotor 30.

The stator coil 110 is supported in slots in an iron core 120, and the iron core is supported by a stator frame 130 provided around the iron core.

Figure 5:
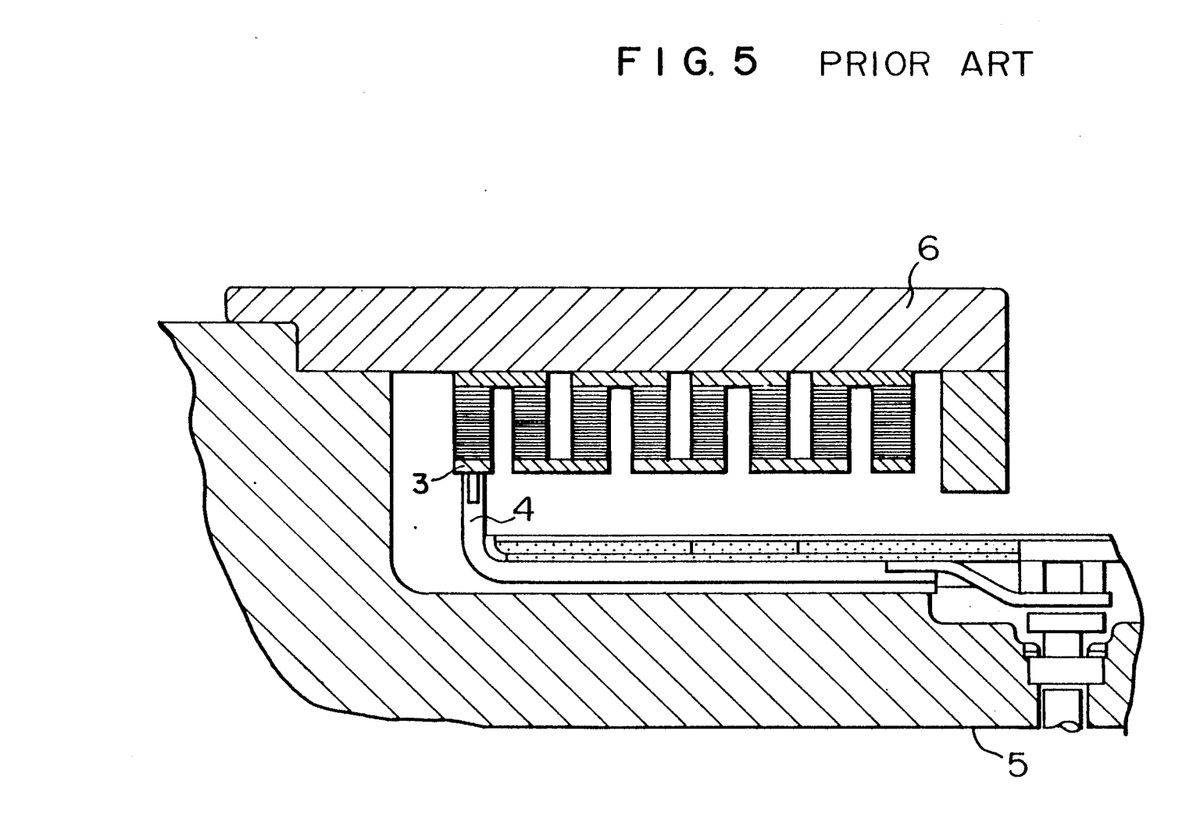
FIG. 5 is a longitudinal sectional view explanatory of a rotor winding end provided at an end of a rotor of a prior art electric rotating machine.
Figure 6:
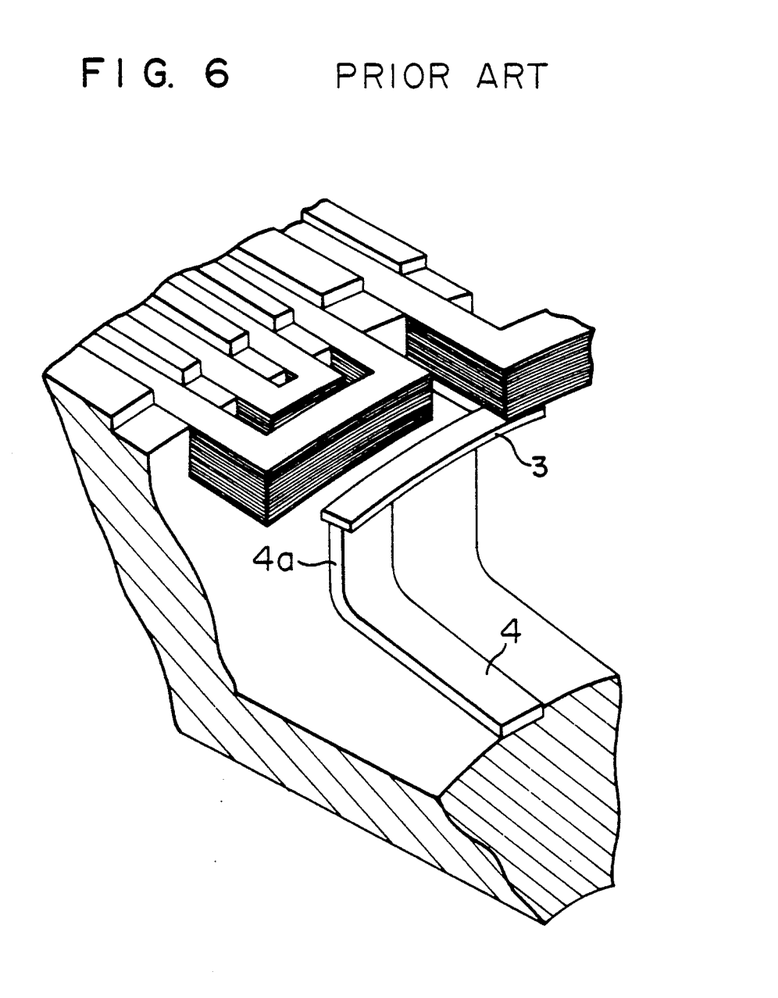
FIG. 6 is a perspective view of a portion of a rotor of the prior art electric rotating machine shown in FIG. 4.
Figure 7:
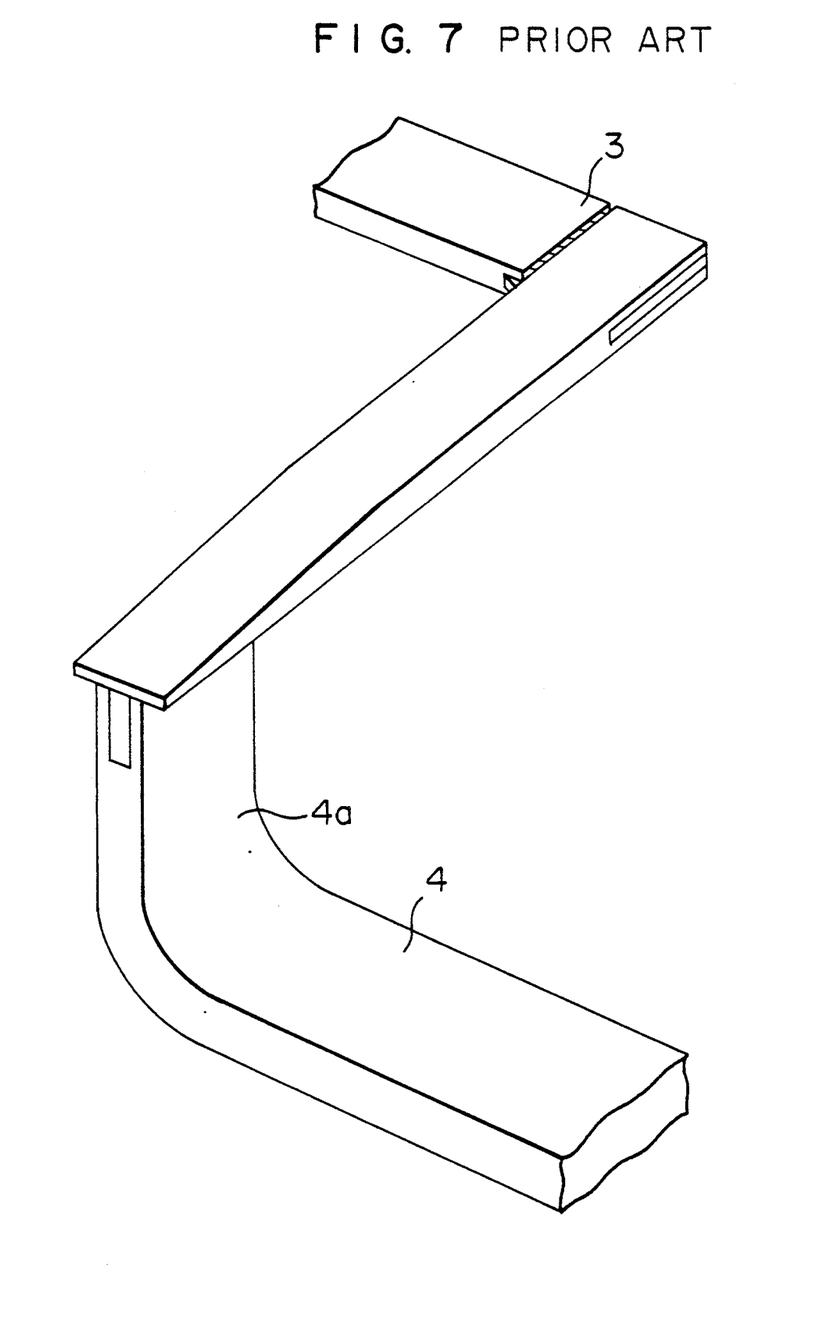
FIG. 7 is a perspective view of a portion of a lead-out portion of a rotor winding of the prior art rotor.

FIGS. 5 and 6 are an enlarged cross-sectional view and an enlarged perspective view of an end portion (shown in FIG. 10) of the rotor winding partially projecting axially from the rotor core, respectively.

In FIGS. 5 and 6, the rotor 30 has slots 2 (not shown in FIG. 5) formed in a surface thereof and receiving the winding, and the ends of the winding in the direction of the axis of the rotor are connected together to form a magnetic pole.

The thus connected rotor winding 3 is connected at its end to the feeder lead wire 4, and this feeder lead wire 4 extends inwardly of the end of the winding, and is passed into a central hole in the rotor 30. A support ring 6 is shrinkage-fitted on an end portion of the rotor 30 after the winding connecting operation. The end of the winding 3 and the feeder lead wire 4 are connected together in a manner shown in FIG. 7. Namely, the end of the winding 3 is extended substantially in a circumferential direction of the rotor 30, and is connected at its distal end to the end of the feeder lead wire 4 by brazing. Because of the nature of its construction, the feeder lead wire 4 has a rising portion 4a, and the rising portion 4a is connected at its distal end to the end of the winding 3 by brazing. Conventionally, this brazing operation is carried out in a manner shown in FIG. 9. Namely, a cooling portion 4b spaced a certain distance X from a brazing portion 4c is provided at the feeder lead wire 4, and the brazing operation is carried out while the feeder lead wire 4 is cooled through the cooling portion 4b. The feeder lead wire 4 is made of a copper alloy in order to have a satisfactory electrical performance, and the copper alloy is softened by the head applied for brazing purposes, so that the compression-resistant hardness of the copper alloy tends to be lowered. The above cooling is carried out in order to limit the extent of the metal softening as much as possible.

Figure 8:
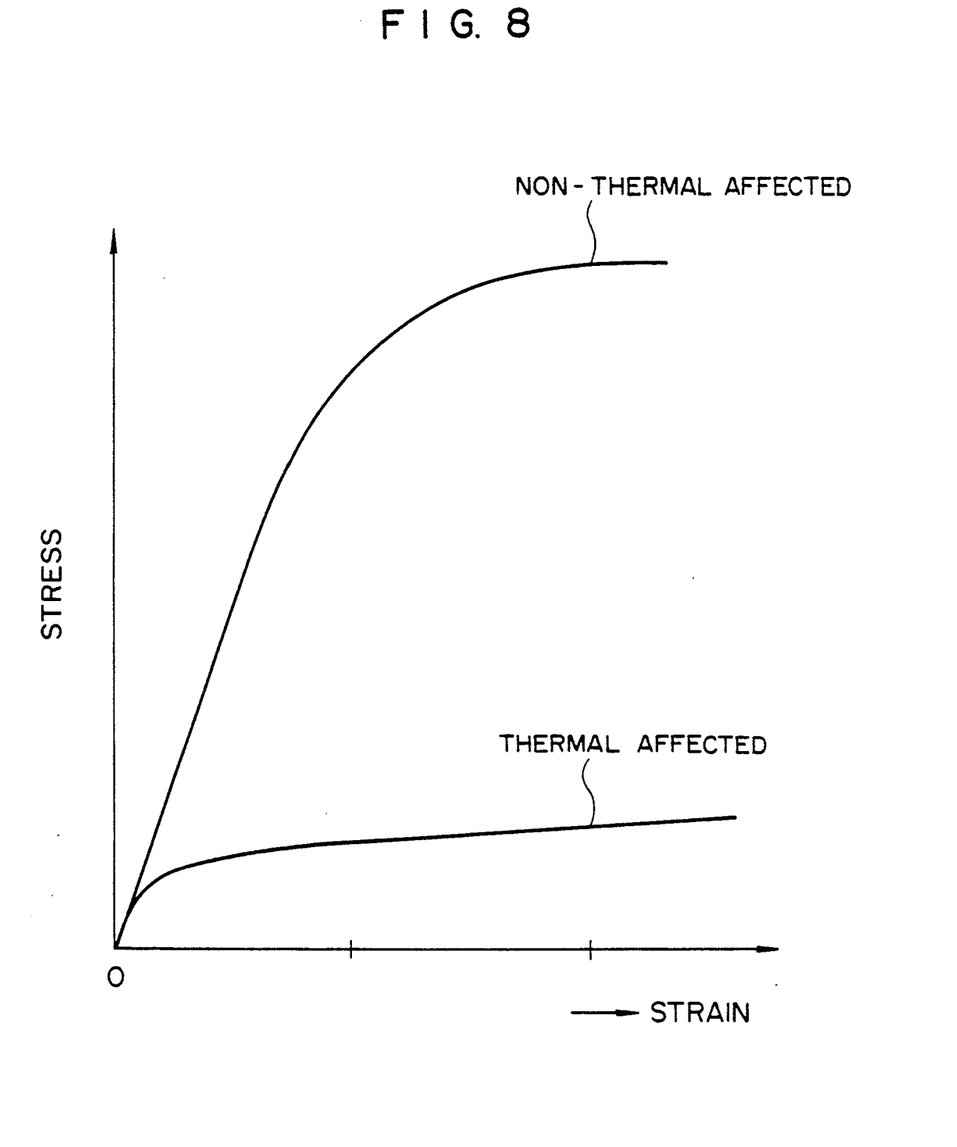
FIG. 8 is a graph showing the relation between a stress and a strain obtained when applying heat to a copper alloy.
Figure 9:
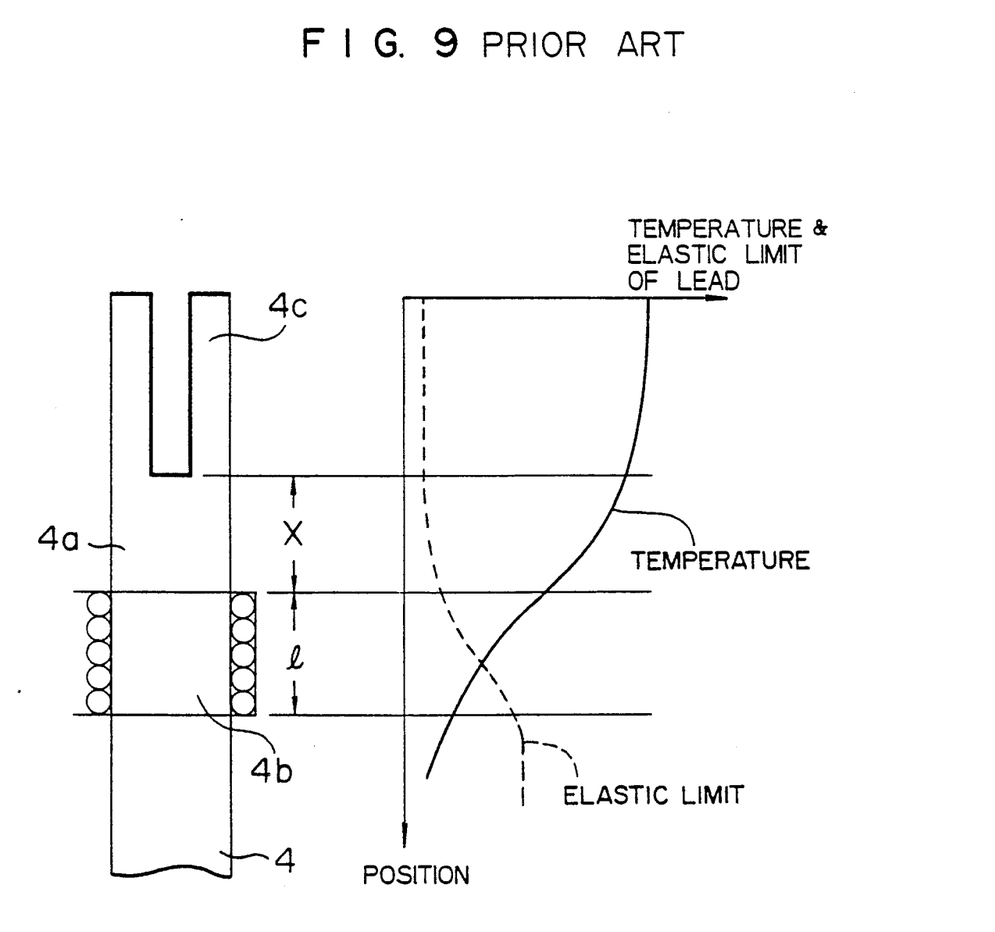
FIG. 9 is a view showing a prior art method of brazing connection of the lead-out portion of FIG. 6, as well as variations in thermal influence and strain acting on the lead-out portion.

In the case where a plate of the copper alloy is shaped by forging, it is known that the relation between the stress and the strain as shown in FIG. 8 is provided when heat of around 700° C. is applied to the copper alloy plate. Namely, when the copper alloy plate is thermally affected, a large strain develops in the copper alloy plate even with a small stress.

In the feeder lead wire softened by the heat, a large centrifugal force acts particularly on its rising portion 4a during a high-speed rotation of the rotor, and as a result a compressive strain develops, and during a long period of the operation of the electric rotating machine, such compressive strain is accumulated.

With respect to the above technique, force withstanding the centrifugal force is not taken into consideration when this technique is applied to the rotor of the electric rotating machine subjected to a large centrifugal force, and therefore there has been encountered a problem that the feeder lead wire is abnormally deformed due to a large centrifugal force and also plastically shrink due to a centrifugal compressive force.

When such abnormal deformation or plastic shrinkage develops, the feeder lead wire and its support structural member are displaced out of position from each other, and loads and displacement acting on each of them become excessive, which may cause cracks and a rupture.

SUMMARY OF THE INVENTION

It is an object of this invention to provide an electric rotating machine including a rotor winding having a feeder lead wire having an increased force withstanding a centrifugal force. The present invention is particularly effective for the rotor winding having the feeder lead wire made of a thick plate.

In order to achieve the above object, in the present invention, a brazing heat dissipation portion is provided at a rising portion of a feeder lead wire subjected to a centrifugal force so as to avoid the influence of heat due to brazing.

Further, the feeder lead wire has a lead portion extending in an axial direction of the rotor and a rising portion extending in a radial direction of the rotor. The feeder lead wire also has a connecting portion extending perpendicularly from the distal end of the rising portion, and the connecting portion has a brazing surface portion and a brazing heat dissipation portion. The brazing surface portion of the connecting portion is brazed to the end of the rotor winding.

The brazing heat dissipation portion has a length of not less than 20 mm.

Further, according to the present invention, there is provided a method of connecting the lead-out portion of the above construction.

In an electric rotating machine having the lead-out portion of the rotor winding according to the present invention, the feeder lead wire necessitated because of the construction of the winding has a limited portion softened by the heat applied for the necessary brazing connection.

Further, the rising portion of the feeder lead wire made particularly of a copper alloy plate is completely prevented from being subjected to the above metal softening, and therefore the rising portion can suitably resist a centrifugal force due to the rotation, and hence is free from plastic deformation.

DESCRIPTION OF THE PREFERRED EMBODIMENT

Figure 1:
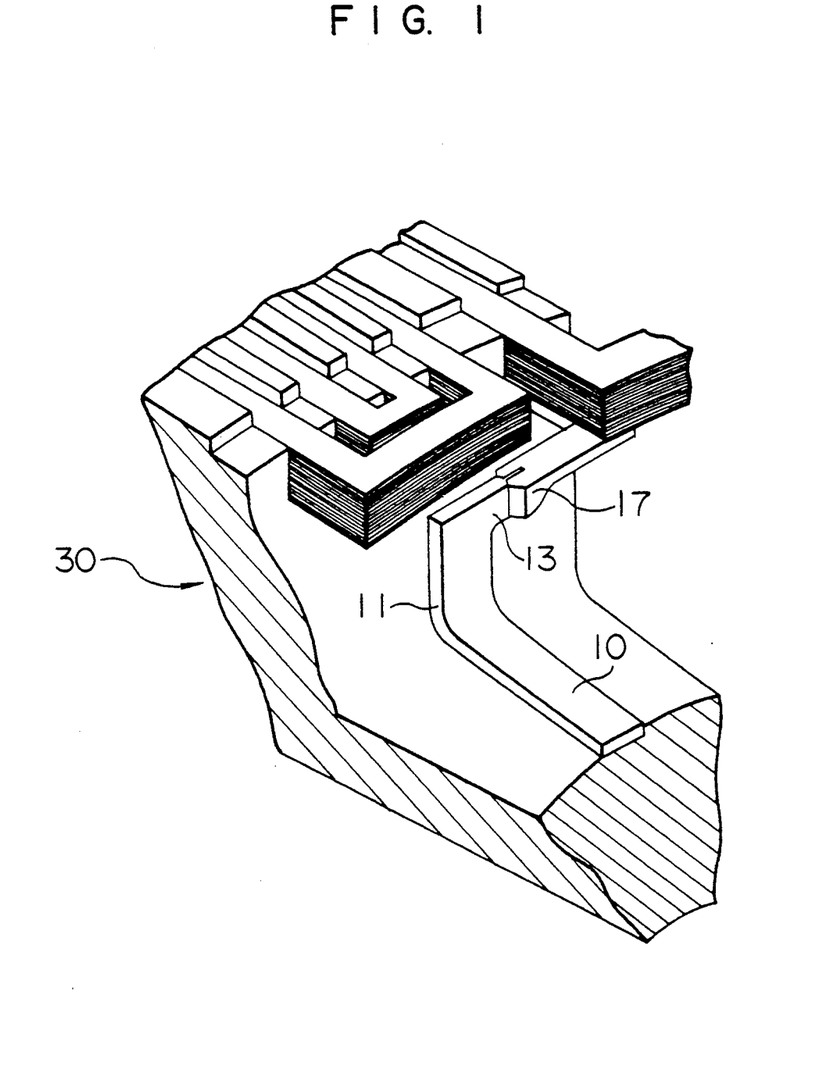
FIG. 1 is a perspective view of a portion of a rotor of an embodiment of an electric rotating machine according to the present invention.
Figure 2:
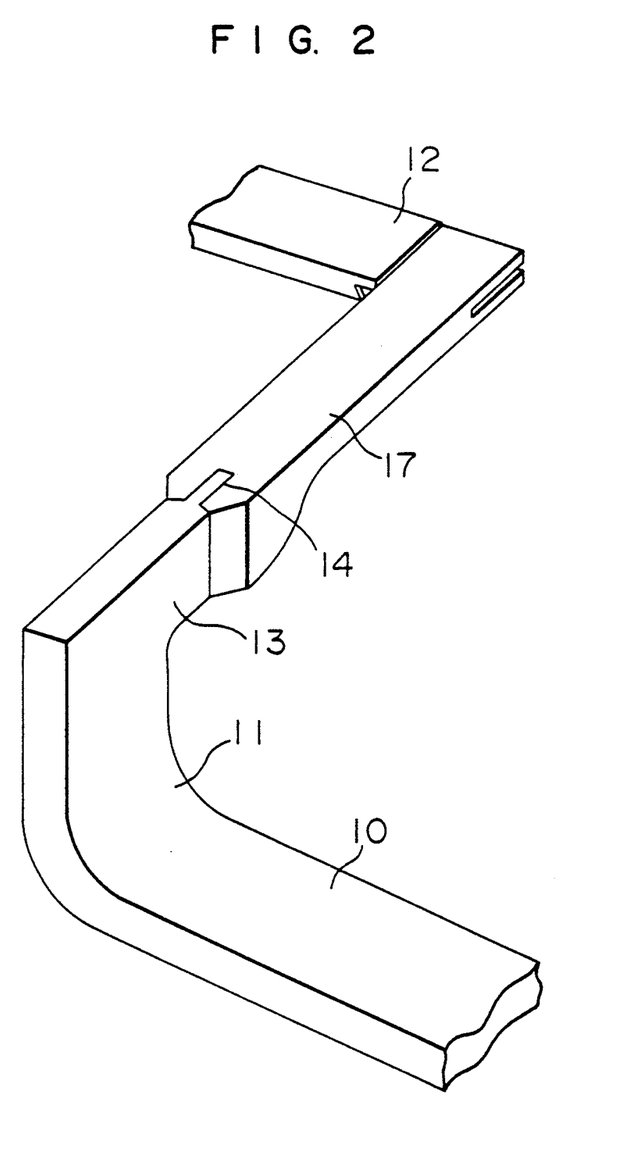
FIG. 2 is a perspective view of a lead-out portion of a rotor winding of the rotor of the machine shown in FIG. 1.
Figure 3:
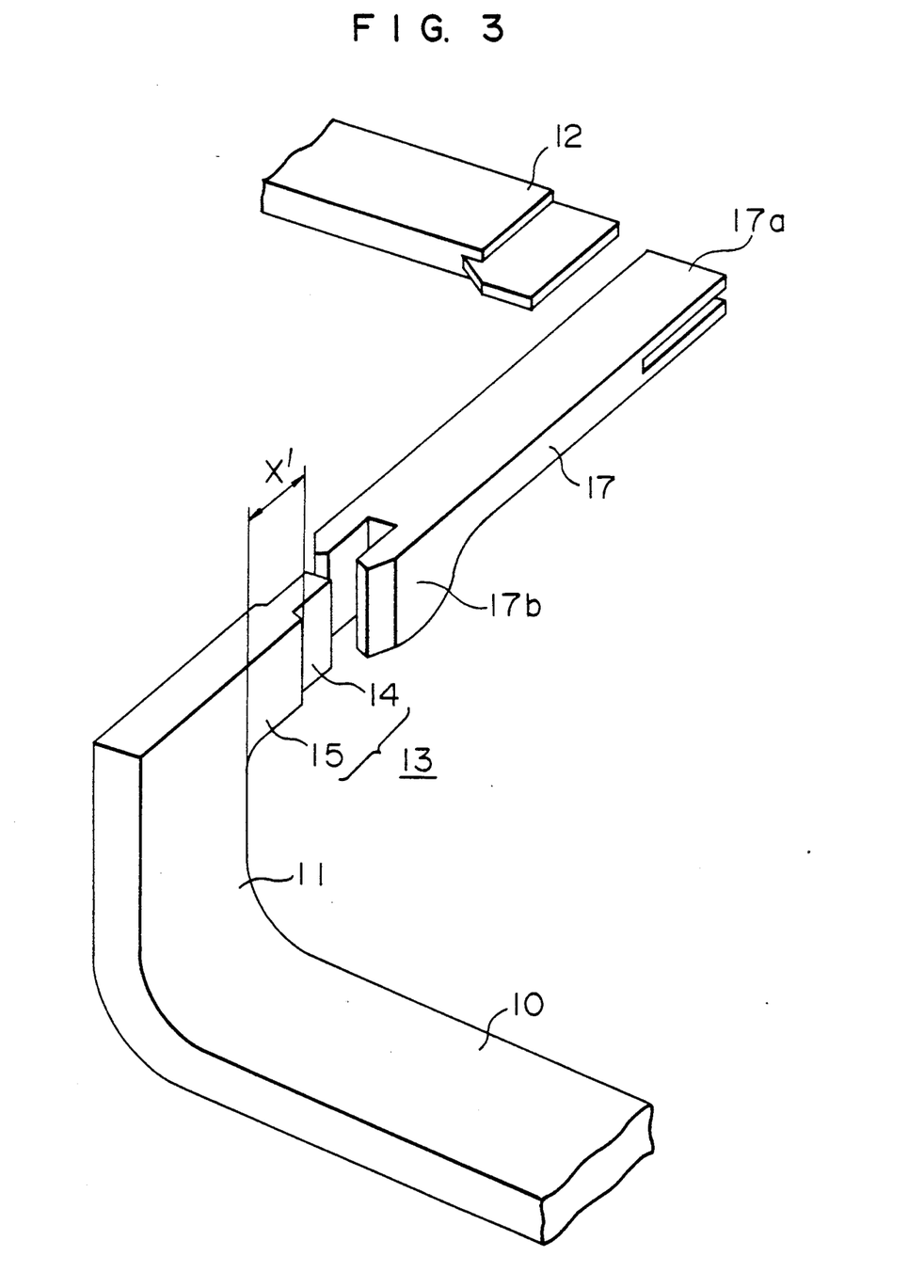
FIG. 3 is an exploded perspective view of the portion of FIG. 2.
Figure 4:
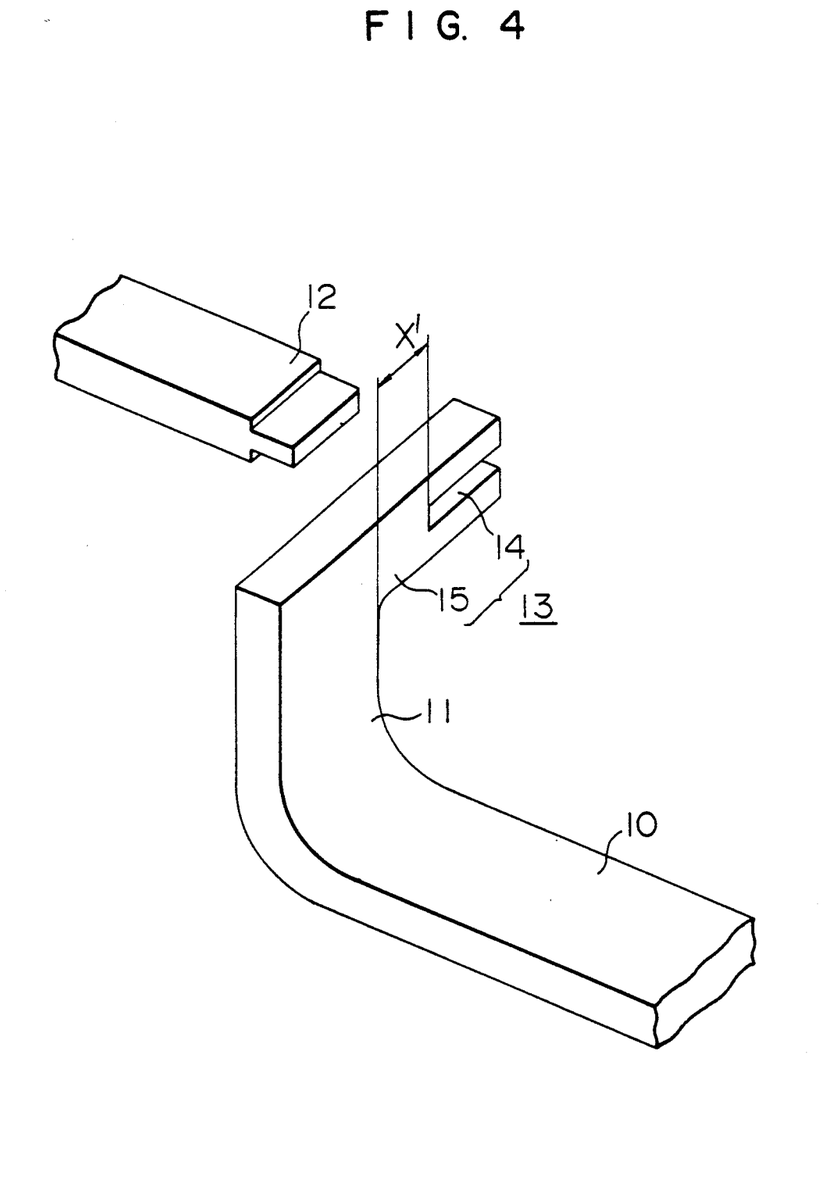
FIG. 4 is an exploded perspective view of a lead-out portion of a rotor winding of another embodiment of the present invention.

A preferred embodiments of the present invention will now be described with reference to FIGS. 1 to 4, FIG. 1 is a perspective view of an embodiment of the present invention corresponding to FIG. 6, and FIGS. 2 and 3 are an enlarged view of a portion of connection between a feeder lead wire and an end of a rotor winding. FIG. 4 is a perspective view of another embodiment of the present invention corresponding to FIG. 1.

The feeder lead wire 10 made of a copper alloy plate or sheet is extended in the axial direction of a rotor and has a rising portion (bending portion) 11 extended in the radial direction of the rotor.

The feeder lead wire 10 has a connecting portion 13 extending perpendicularly and circumferentially from a distal end of the rising portion 11. The connecting portion 13 has a brazing surface portion 14, and a brazing heat dissipation portion 15 lying between the brazing surface 14 and the rising portion 11 of the feeder lead wire 10. The brazing surface portion 14 is connected by brazing to an end portion of a rotor winding 12 through an interconnecting wire 17. The interconnecting wire 17 can be omitted when the end of the rotor winding 12 is electrically connected directly to the feeder lead wire 10 as shown in FIG. 4.

FIG. 3 is an exploded perspective view of the parts shown in FIG. 2. The connecting portion 13 of the feeder lead wire 10 is offset from the rising portion 11, and therefore the centrifugal force does not directly act, as a compressive stress, on the connecting portion 13.

Further, since the brazing surface portion 14 is spaced from the rising portion 11 by the brazing heat dissipation portion 15, the rising portion 11 of the forged feeder lead wire 10 is completely prevented from being softened due to the brazing heat.

Therefore, the brazing heat dissipation portion 15 has a suitable size and a suitable length. The size and length of the brazing heat dissipation portion 15 are determined to meet the following requirements.

First, the brazing heat dissipation portion 15 needs to have a sufficient heat capacity to dissipate the heat applied by the brazing when a brazing material is heated to penetrate into the mated surfaces of the interconnecting wire 17 and the brazing surface portions 14 combined therewith.

Secondly, the brazing heat dissipation portion 15 needs to have a sufficient size to enable a cooling device (which assists in the heat dissipation) to be connected thereto.

Thirdly, it is necessary to determine the optimum space-occupying factor so that the size of the brazing heat dissipation portion 15 may not be excessive. If only the heat dissipation is considered, the heat dissipation portion 15 would be excessively large.

Upon study of the present invention, it has been found that the length X' of the brazing heat dissipation portion 15 should preferably be not less than 20 mm.

Next, the connection method will now be described. The rotor windings are received in the slots in the rotor, and the rotor windings disposed in the direction of the axis of the rotor are connected together at their ends, thereby forming the winding. One end 17a of the interconnecting wire 17 is combined with the end of the winding 12, and a brazing material is caused to penetrate into the mated surfaces of the thus combined portions while heating these combined portions, so that the combined portions are firmly bonded together. Then, the preformed feeder lead wire 10 is incorporated into the rotor, and the brazing surface portion 14 of the feeder lead wire 10 is combined with the other end 17b of the interconnecting wire 17. The device for absorbing and cooling the brazing heat is attached to the brazing heat dissipation portion 15 of the feeder lead wire 10. This cooling device may be an aluminum pipe which is wound around the brazing heat dissipation portion 15 and passes water therethrough, or a good thermally-conductive material which is affixed to the brazing heat dissipation portion 15 and is forcibly cooled by a separate cooling device. Then, the brazing surface portion 14 and the other end 17b of the interconnecting wire 17 are brazed together as described above for the connection between the end of the winding 12 and the one end 17a of the interconnecting wire 17. With this connecting method, the heat applied for the brazing is not transmitted to the rising portion 11 of the feeder lead wire 10 made of the plate material, and therefore the rising portion 11 is not softened by the heat.

In the present invention, endurance of the rising portion of the feeder lead wire against the contrifugal force is improved, and therefore the rotor structure of the present invention can be applied to a turbine generator of a large capacity having a large diameter and capable of rotating at high speed.

What is claimed is:

1. In a rotor for an electric rotating machine, comprising a rotatable shaft; an iron core rotatable with said rotatable shaft; a rotor winding wound in a laminated manner and partially extending from said iron core in an axial direction; and a feeder lead wire connected to an inner end of said rotor winding so as to supply field current to said rotor winding;
    wherein said feeder lead wire has a rising portion extending radially outwardly of said rotatable shaft, and a connecting terminal extending from said rising portion in a circumferential direction of said rotatable shaft.

2. A rotor claimed in claim 1, wherein said connecting terminal comprises a brazing surface portion brazed to said rotor winding and a brazing heat dissipation portion lying between said brazing surface portion and said rising portion.

3. In a rotor for an electric rotating machine, comprising a rotatable shaft; an iron core rotatable with said rotatable shaft; a rotor winding wound in a laminated manner and partially extending from said iron core in an axial direction; and a feeder lead wire connected to an inner end of said rotor winding so as to supply field current to said rotor winding;
    wherein said feeder lead wire has a plate-like rising portion extending radially outwardly of said rotatable shaft, and a connecting end portion extending from a side surface of an end of said plate-like rising portion in a circumferential direction of said rotatable shaft, said connecting end portion being brazed to the inner end of said rotor winding.

4. A rotor claimed in claim 3, wherein said connecting end portion comprises a brazing surface portion brazed to said rotor winding and a brazing heat dissipation portion lying between said brazing surface portion and said rising portion.

5. A rotor for a electric rotating machine, comprising a rotatable shaft; an iron core rotatable with said rotatable shaft; a rotor winding provided at said iron core in a laminated winding manner; and a feeder lead wire brazed to an inner end of said rotor winding so as to supply field current to said rotor winding; said feeder lead wire having a rising portion in the vicinity of a portion of said feeder lead wire connected to said rotor winding, said feeder lead wire being brazed to the inner end of said rotor winding at a position offset from said rising portion in a circumferential direction of said rotatable shaft.

6. A rotor claimed in claim 5, wherein said portion of said feeder lead wire connected to said rotor winding comprises a brazing surface portion brazed to said rotor winding and a brazing heat dissipation portion lying between said brazing surface portion and said rising portion.

7. An electric rotating machine comprising a stator core; a stator winding provided at said stator core in a winding manner; a rotor core rotatably mounted inside of said stator core; a rotor winding provided at said rotor core in a winding manner; and a feeder lead wire for supplying field current to said rotor winding, said feeder lead wire having a bent portion extending radially outwardly of a rotatable shaft of said rotor, and a connecting end portion extending from said bent portion in a circumferential direction of said rotatable shaft.

8. An electric rotating machine claimed in claim 7, wherein said connecting end portion comprises a brazing surface portion brazed to said rotor winding and a brazing heat dissipation portion lying between said brazing surface portion and said bent portion.

* * * * *